United States Patent
Zhang et al.

(10) Patent No.: US 11,307,967 B2
(45) Date of Patent: Apr. 19, 2022

(54) TEST ORCHESTRATION PLATFORM

(71) Applicant: Oracle International Corporation, Redwood Shores, CA (US)

(72) Inventors: Yingfei Zhang, Foster City, CA (US); Gavin Chen, Redwood City, CA (US); Eileen He, Redwood City, CA (US); Eric Cao, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 16/361,510

(22) Filed: Mar. 22, 2019

(65) Prior Publication Data

US 2020/0250074 A1 Aug. 6, 2020

Related U.S. Application Data

(60) Provisional application No. 62/801,015, filed on Feb. 4, 2019.

(51) Int. Cl.
*G06F 11/36* (2006.01)
*G06F 9/44* (2018.01)

(52) U.S. Cl.
CPC ............ *G06F 11/3664* (2013.01); *G06F 9/44* (2013.01); *G06F 11/3684* (2013.01); *G06F 11/3688* (2013.01)

(58) Field of Classification Search
CPC ............ G06F 11/3664; G06F 11/3684; G06F 11/3688; G06F 9/44
See application file for complete search history.

(56) References Cited

U.S. PATENT DOCUMENTS

| 6,772,083 B2 * | 8/2004 | Muller ................ G06F 11/3664 |
| | | 702/123 |
| 9,032,373 B1 | 5/2015 | Gupta et al. |

(Continued)

FOREIGN PATENT DOCUMENTS

| CN | 105224466 A | 1/2016 |
| CN | 105630488 A | 6/2016 |
| CN | 105760167 A | 7/2016 |
| CN | 106873975 A | 6/2017 |
| WO | 2017/020251 A1 | 2/2017 |

OTHER PUBLICATIONS

Gérald Barré, "Integration testing using a docker container", Oct. 8, 2018, Meziantou's Blog (https://www.meziantou.net/integration-testing-using-a-docker-container.htm) (Year: 2018).*

(Continued)

*Primary Examiner* — Bryce P Bonzo
*Assistant Examiner* — Michael Xu
(74) *Attorney, Agent, or Firm* — Invoke

(57) ABSTRACT

Techniques for test orchestration are disclosed. A system executes multiple test execution plans, using instances of a same test container image that encapsulates a test environment and instances of at least two different test support container images that are specified by different user-defined test configurations and each configured to perform, respectively, one or more test support operations. To execute each of the test execution plans, the system generates a respective instance of the test container image and one or more test support containers. A particular test execution plan includes generating a test support container that is specified in a corresponding user-defined test configuration and that is different from any test support container specified in another user-defined test configuration.

20 Claims, 11 Drawing Sheets

(56) References Cited

U.S. PATENT DOCUMENTS

| | | | | |
|---|---|---|---|---|
| 2010/0146514 | A1* | 6/2010 | Alexander | G06F 9/5083 |
| | | | | 718/104 |
| 2011/0231708 | A1* | 9/2011 | Lawrance | G06F 11/3664 |
| | | | | 714/38.1 |
| 2013/0152047 | A1* | 6/2013 | Moorthi | G06F 11/368 |
| | | | | 717/124 |
| 2018/0089068 | A1* | 3/2018 | Bhojan | G06F 8/61 |
| 2018/0113734 | A1* | 4/2018 | Yamato | H04L 67/10 |
| 2018/0131766 | A1* | 5/2018 | Wunderlich | H04L 67/14 |
| 2018/0336123 | A1* | 11/2018 | Benes | G06F 11/3688 |
| 2020/0201747 | A1* | 6/2020 | Duale | G06F 11/3664 |

OTHER PUBLICATIONS

Sun et al., Improve Software Testing with Containers, Software Development Magazine—Project Management, Programming, Software Testing, http://www.methodsandtools.com/archive/containertesting.php, 5 pages, Jun. 2017.

Selenium-Grid, Selenium Documentation, 7 pages, Retrieved on Apr. 4, 2018, https://www.seleniumhq.org/docs/07_selenium_grid.jsp.

Running multiple tests on Docker images, IBM Knowledge Center, Retrieved on Apr. 4, 2018, 4 pages, https://www.ibm.com/support/knowledgecenter/en/SSBLQQ_9.1.1/com.ibm.rational.test.lt.rtw.webgui.doc/topics/t_run_test_multiple_docker.html.

Rana, How To Achieve Practical End-to-End Testing With Docker Compose, Runnablog, Retrieved on Mar. 2018, https://runnable.com/blog/how-to-achieve-practical-end-to-end-testing, 9 pages.

HP Unified Functional Testing (Quick Test Professional + HP Service Test), Automation Consultants, https://www.automation-consultants.com/products/hp-products/hp-unified-functional-testing-quick-test-professional-hp-service-test/, 6 pages.

Builds and images overview, Docket Documentation, https://docs.docker.com/docker-cloud/builds/, 2 pages.

Automated repository tests, Docker Documentation, https://docs.docker.com/docker-cloud/builds/automated-testing/, 3 pages.

* cited by examiner

FIG. 4
User-Supplied Configuration Data 400
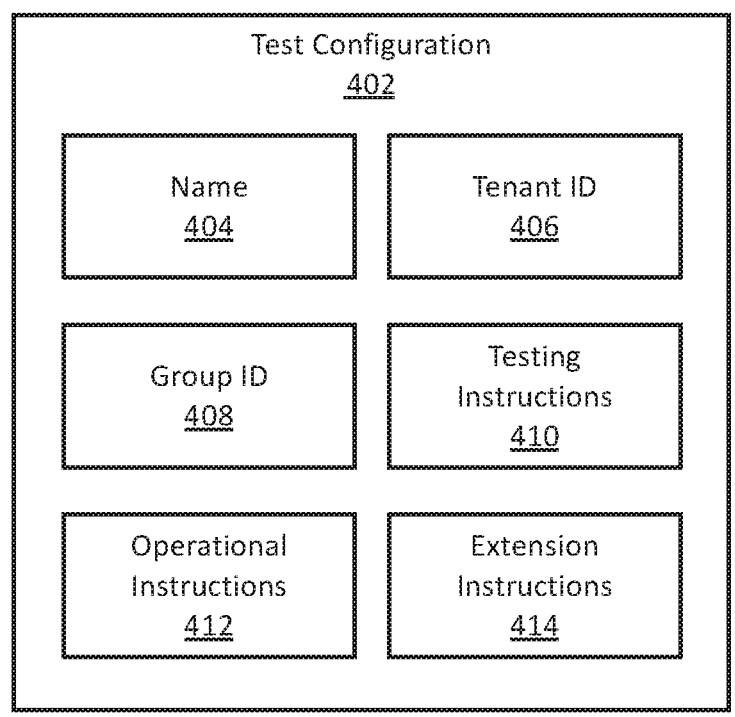
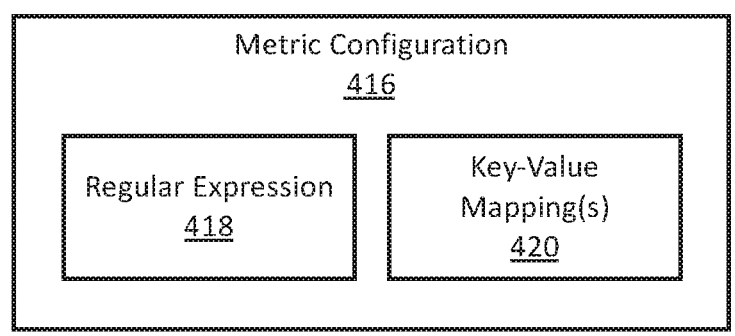

TEST ORCHESTRATION PLATFORM

This application claims the benefit of U.S. Provisional Patent Application 62/801,015, filed Feb. 4, 2019, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to testing. In particular, the present disclosure relates to testing platforms.

BACKGROUND

Testing is an important part of quality assurance in software development, hardware design, and other industries. To ensure that a particular software application or hardware design functions properly under different environments, the software application or hardware design may be tested in a variety of test environments. Different test environments may include different operating systems, web browsers, communications protocols, central processing units (CPU's), database management systems, or any other software and/or hardware component(s) or combination thereof. Manually preparing a test environment for a particular test may be a time-consuming and error-prone process.

A container is a standardized, encapsulated software-only module that executes on top of a container platform. A container platform executes in a host operating system, which operates on a set of underlying hardware infrastructure. Multiple containers may execute on a single container platform, sharing the same underlying operating system and hardware infrastructure.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates user-supplied configuration data in accordance with one or more embodiments;

DETAILED DESCRIPTION

Figure 1:
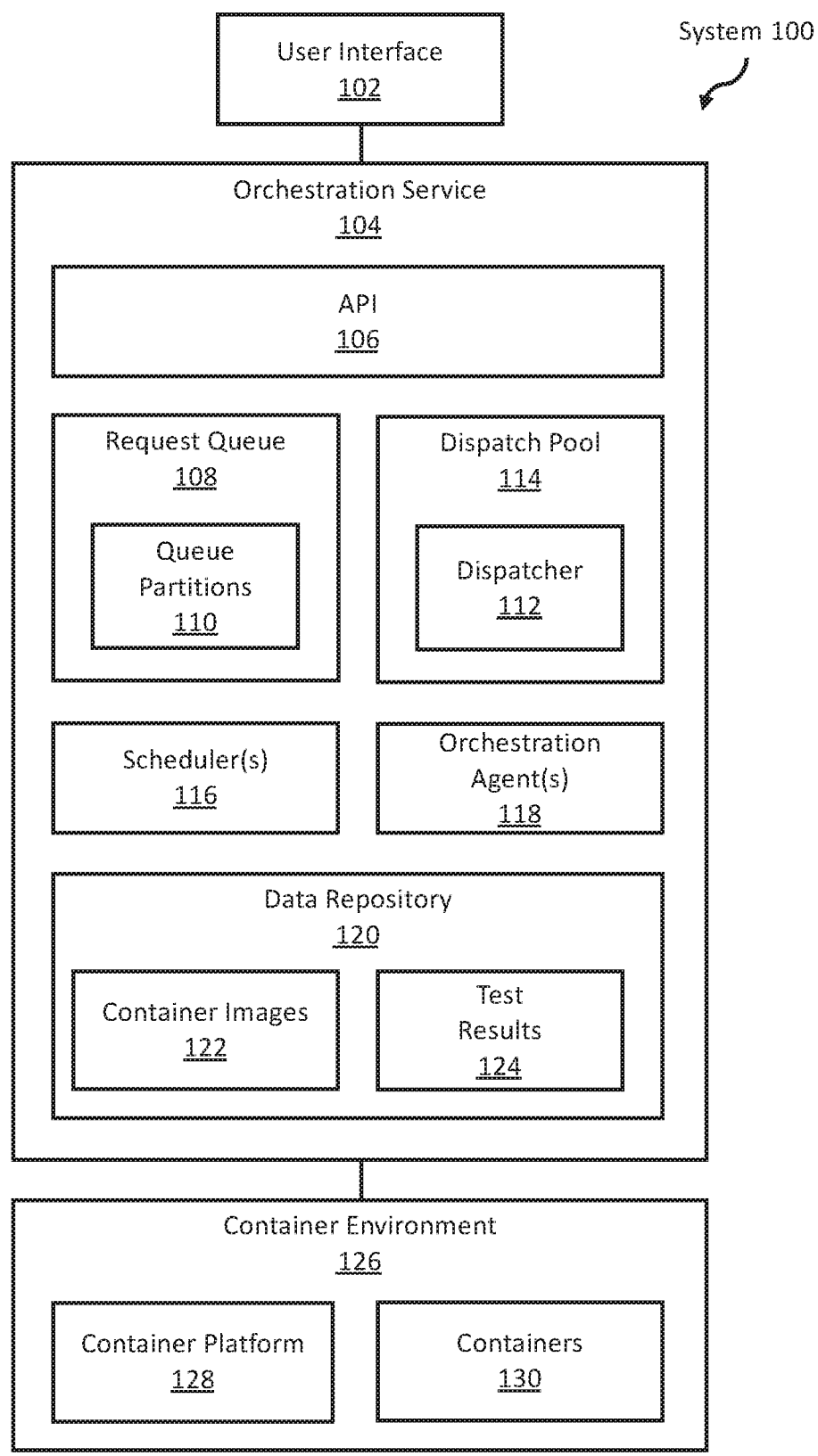
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 SYSTEM
2.2 CONTAINER ENVIRONMENT
2.3 CONTAINER POD
2.4 USER-SUPPLIED CONFIGURATION DATA
3. PREPARING FOR TEST ORCHESTRATION
4. DISPATCHING A TEST REQUEST
5. TEST ORCHESTRATION
6. ILLUSTRATIVE EXAMPLES
6.1 SINGLE-USE CONTAINER
6.2 SINGLE-USE CONTAINER WITH DEBUGGING ENABLED
6.3 PERPETUAL CONTAINER
7. MISCELLANEOUS; EXTENSIONS
8. HARDWARE OVERVIEW
9. COMPUTER NETWORKS AND CLOUD NETWORKS
10. MICROSERVICE APPLICATIONS

1. GENERAL OVERVIEW

A test orchestration platform uses programmatic tools to configure and execute software components used for testing. The test orchestration platform receives a request to perform a test and, based on the request, configures and executes the software components needed to service the test with minimal, if any, additional user input. Test orchestration improves the efficiency of servicing test requests and reduces the frequency of errors and inaccuracies that occur when users try to manually configure software components for testing.

In an embodiment, the test orchestration platform orchestrates support containers to execute different configurations of test execution plans in a same test environment. The test orchestration platform orchestrates and executes test execution plans based on user-supplied configuration data. The user-supplied configuration data may be different across different tests, even when using test containers that are instances of the same test container image that encapsulates the same test environment. The test orchestration platform orchestrates support containers, one or more of which are specified in the user-supplied configuration data, to execute different configurations of test execution plans. Orchestrating different configurations of test containers is an efficient, flexible approach that provides access to a configurable set of pre-test, in-test, and/or post-test support operations with minimal user input to configure each test.

One or more embodiments allocate test requests across multiple test orchestration agents to provide load balancing and improve resource utilization. Load balancing may be beneficial when performing large numbers of tests simultaneously. For example, the test orchestration platform may be a multi-tenant service configured to orchestrate and execute multiple different test execution plans for multiple tenants. One or more embodiments perform efficient, scalable test orchestration operations for multiple tenants.

One or more embodiments described in this Specification and/or recited in the claims may not be included in this General Overview section.

2. ARCHITECTURAL OVERVIEW

2.1 System

FIG. 1 illustrates a system 100 in accordance with one or more embodiments. As illustrated in FIG. 1, system 100 includes a user interface 102, an orchestration service 104, a container environment 126, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system 100 includes a test orchestration platform, implemented as one or more of components described below, configured to orchestrate and execute test execution plans based on user-supplied configuration data.

In one or more embodiments, user interface 102 refers to hardware and/or software configured to facilitate communications between a user and an orchestration service 104. Specifically, the user interface 102 may be configured to receive user input corresponding to a test configuration and/or a metric configuration. Examples of test configurations and metric configurations are described below. Alternatively or additionally, the user interface 102 may be configured to receive user input corresponding to a test request, to be dispatched by the orchestration service 104. Alternatively or additionally, the user interface 102 may be configured to receive user input corresponding to a container image that encapsulates a test environment. In an embodiment, the user interface 102 consumes one or more functions specified by an API 102 of the orchestration service 104, based on user input to the user interface 102.

In an embodiment, user interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 102 is specified in one or more other languages, such as Java, C, or C++.

In an embodiment, an orchestration service 104 refers to hardware and/or software configured to perform operations described herein for preparing for test orchestration, dispatching a test request, and/or test orchestration. Examples of operations for preparing for test orchestration, dispatching a test request, and test orchestration are described below.

In an embodiment, an orchestration service 104 includes an application programming interface (API) 106. The API 106 includes a set of programmatic interfaces that expose, respectively, different functions of the orchestration service 104 to one or more consumers of those functions. For example, the API 106 may include one or more programmatic interfaces configured to receive user-supplied configuration data, a test request, a location (e.g., a local or remote file path) of a container image that encapsulates a test environment, a request for metrics, a request for data generated and/or collected by the orchestration service 104, and/or any other kind of API call specified by the API 106 or combination thereof. The API 106 may expose one or more functions to one or more components of the orchestration service 104 itself. The API 106 may be implemented as a representational state transfer (REST) interface and/or any other kind of API implementation or combination thereof.

In an embodiment, an orchestration service 104 includes a request queue 108. The request queue 108 is configured to store a request (e.g., a test request) until the request is dispatched to another component of the orchestration service 104. The request queue 108 may include one or more queue partitions 110. As one example, the request queue 108 may implement an Kafka messaging system, and each queue partition 110 may correspond to a different Kafka partition. As another example, the request queue 108 may implement an Azure Event Hubs event processing service, and each queue partition 110 may correspond to a different Event Hub partition. The orchestration service 104 may use queue partitions 110 for load balancing, as described below.

In an embodiment, an orchestration service 104 includes a dispatcher 112. The dispatcher 112 is configured to retrieve a request from the request queue 108 and dispatch the request. Examples of operations for dispatching a request are described below. In an embodiment, the dispatcher 112 dispatches a request to a scheduler 116. The dispatcher 112 may dispatch the request to a particular scheduler 116 based on one or more load balancing policies as described below.

In an embodiment, a dispatcher 112 is part of a dispatch pool 114. A dispatch pool 114 may organize multiple dispatchers (not shown) as a cluster. In one example, each cluster of dispatchers includes a leader dispatcher and two follower dispatchers. The leader and followers may cluster using a gossip protocol. In an embodiment, if a leader dispatcher terminates, a follower dispatcher becomes the leader and attempts to obtain a new follower dispatcher from the dispatch pool 112.

In an embodiment, an orchestration service 104 includes one or more schedulers 116. Each scheduler 116 is configured to communicate with one or more orchestration agents 118. Specifically, a scheduler 116 may be configured to receive a request from a dispatcher 112 and assign (also referred to as scheduling) the request to a particular orchestration agent 118.

In an embodiment, an orchestration service 104 includes one or more orchestration agents 118. Each orchestration agent 118 is configured to orchestrate the full lifecycle of a test job, based on a test request and user-supplied configuration data. Examples of operations for test orchestration are described below.

In an embodiment, the orchestration service 104 is configured to orchestrate and execute a test execution plan using containers 130 in a container environment 126. Specifically, the container environment 126 includes containers 130 executing on a container platform 128. The container platform 128 may be a Docker® container platform and/or any other kind of container platform or combination thereof. The orchestration service 104 may be configured to orchestrate and execute a test execution plan using containers 130 prepared according to the container platform's 128 specifications. Alternatively or additionally, the container environment 126 may include one or more container management services, such as Kubernetes, Docker Swarm, and/or any other kind of container management service or combination thereof. An example of a container environment is described in further detail below.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2.2 Container Environment

Figure 2:
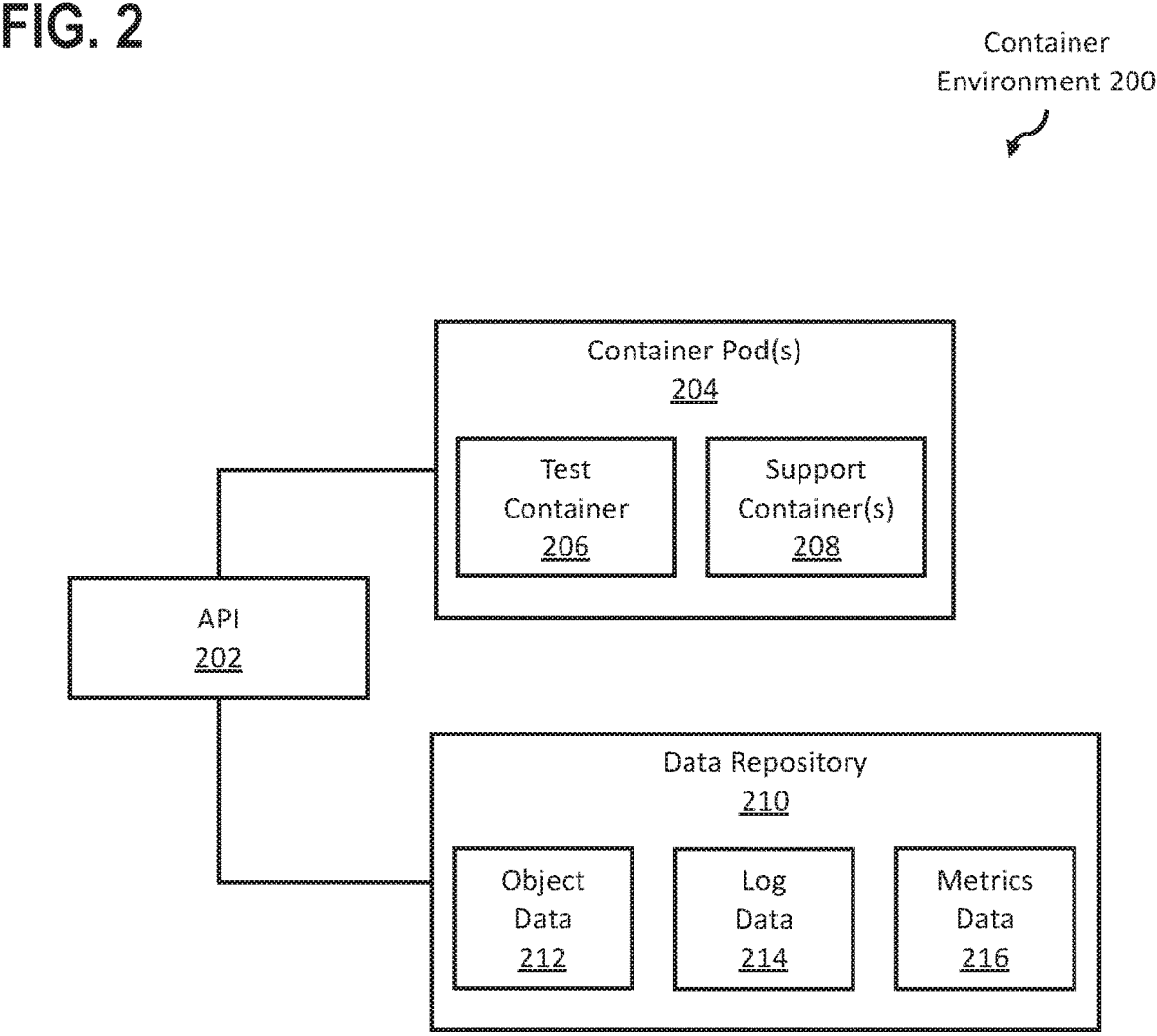
FIG. 2 illustrates a container environment in accordance with one or more embodiments.

FIG. 2 illustrates a container environment 200 in accordance with one or more embodiments. As illustrated in FIG. 2, container environment 200 includes an API 202, one or more container pods 204, a data repository 210, and various components thereof. In one or more embodiments, the container environment 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a container environment 200 includes an API 202. The API 202 includes a set of programmatic interfaces that expose, respectively, different functions of the container environment 200 (e.g., functions of a container platform, not shown) to one or more consumers of those functions. For example, the API 202 may include one or more programmatic interfaces configured to instantiate a container, pause a container, terminate a container, restart a container, and/or any other kind of API call specified by the API 202 or combination thereof. The API 202 may be supplied by a container management service, such as Kubernetes or Docker Swarm.

In an embodiment, containers in the container environment 200 are organized in one or more container pods 204. Specifically, a container pod 204 may include a test container 206 and one or more support containers 208. A test container 206 is a container that encapsulates a test environment, i.e., the environment that includes the software to be tested. A support container 208 is a container that is configured to perform one or more test support operations. Test containers and support containers are described in further detail below.

In an embodiment, a data repository 210 is any type of storage unit and/or device (e.g., a file system, database, collection of tables, or any other storage mechanism) for storing data. Further, a data repository 210 may include multiple different storage units and/or devices. The multiple different storage units and/or devices may or may not be of the same type or located at the same physical site. Further, a data repository 210 may be implemented or may execute on the same computing system as one or more other components of the container environment 200. Alternatively or additionally, a data repository 210 may be implemented or executed on a computing system separate from one or more components of the container environment 200. A data repository 202 may be communicatively coupled to one or more other components via a direct connection or via a network.

In an embodiment, a data repository 210 is configured to store object data 212. Object data 212 may include input data, to be used by the test container 206 when performing a test. Alternatively or additionally, object data 212 may include test output data. As one example, object data 212 includes a data set to be supplied as input to a test operation. The test operation processes the input data and generates a transformed data set, which is stored back into the object data 212.

In an embodiment, a data repository 210 is configured to store log data 214. Log data 214 includes data gathered from one or more logging systems in a test container 206. Alternatively or additionally, a data repository 210 may be configured to store metrics data 216. Metrics data 216 includes metrics (i.e., quantified data) relating to one or more tests. A support container 208 may be configured to generate metrics data 216 based on log data 214.

Information describing object data 212, log data 214, and/or metrics data 216 may be implemented across any of components within the container environment 200. However, this information is illustrated within the data repository 210 for purposes of clarity and explanation.

2.3 Container Pod

Figure 3:
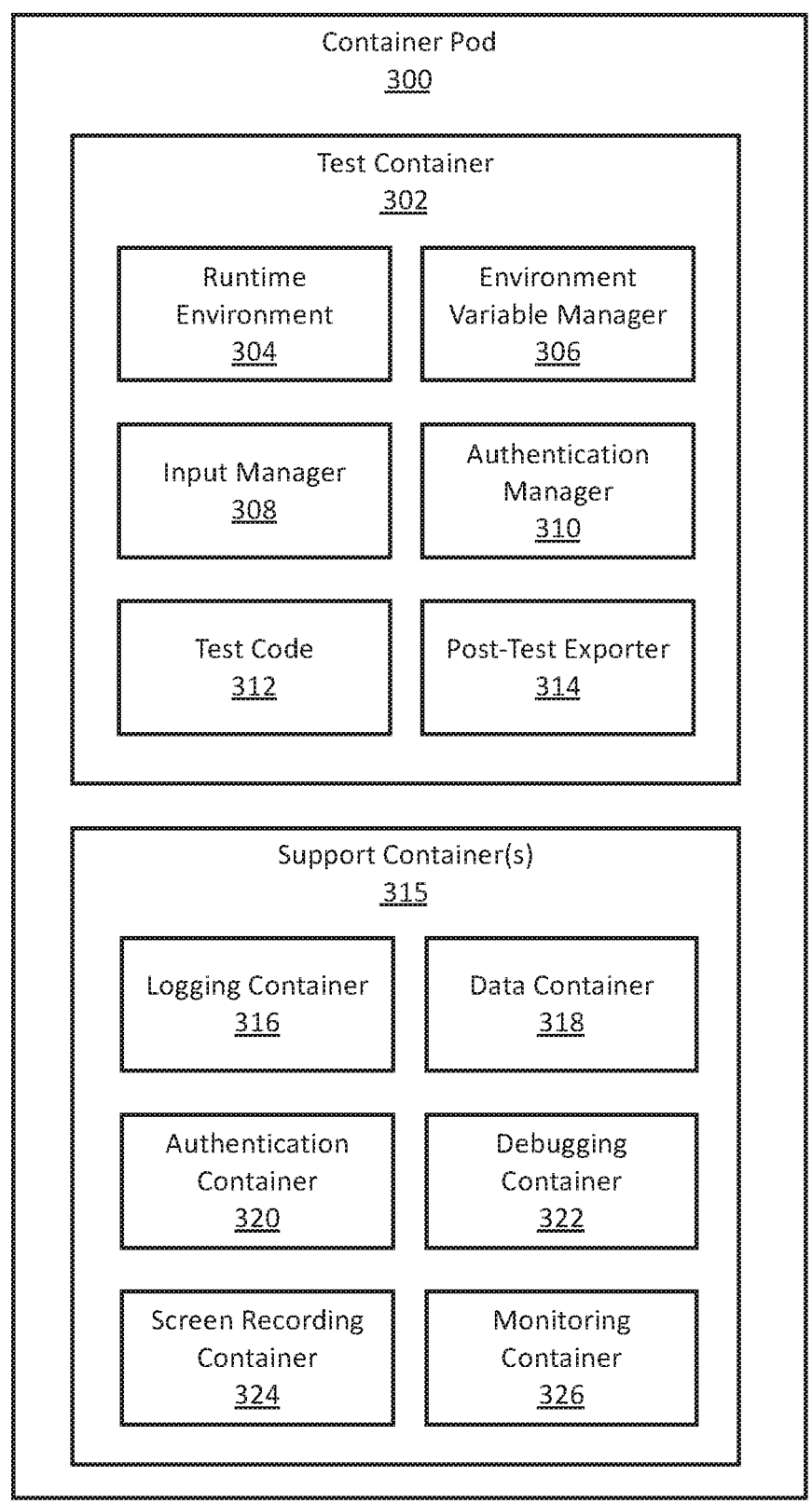
FIG. 3 illustrates a container pod in accordance with one or more embodiments.

FIG. 3 illustrates a container pod 300 in accordance with one or more embodiments. As illustrated in FIG. 3, container pod 300 includes a test container 302, one or more support containers 315, and various components thereof. In one or more embodiments, the container pod 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a container pod 300 includes a test container 302. As used herein, the term 'container' refers to an instance of a container image. A test container 302 is a container that encapsulates a test environment, i.e., the environment that includes the software to be tested. Specifically, the test container 302 includes a runtime environment 304 and executable code configured to execute using the runtime environment 304.

In an embodiment, the test container 302 includes an environment variable manager 306. The environment variable manager 306 is configured to read and process environment variables supplied by the container environment (not shown). One or more environment variables may include the location(s) of metadata used for testing, such as a test identifier (ID) associated with a particular test job, an address of an endpoint exposed by a test orchestration service and/or one or more support containers, and/or any other kind of metadata or combination thereof. Examples of endpoints include, but are not limited to: an endpoint for retrieving and/or storing object data; an endpoint for retrieving and/or storing log data; an endpoint for retrieving and/or storing metric data; an endpoint for retrieving and/or storing credentials; and/or any other kind of endpoint or combination thereof. In an embodiment, test automation code in the test container 302 uses one or more environment variables to interact with one or more pre-test tasks, in-test tasks, and/or post-test tasks via a support container.

In an embodiment, the test container 302 includes an input manager 308. The input manager 308 is configured to import data from an input file path, to use in one or more tests. The input manager 308 may obtain the input file path from an environment variable (e.g., an environment variable obtained by an environment variable manager 306). Alternatively or in addition, the input manager 308 may be configured to use a default input file path. The input manager 308 may be configured to use the default input file path if an alternative environment variable is not available.

In an embodiment, the test container 302 includes an authentication manager 310, which may also be referred to as a "secret manager." The authentication manager 310 is configured to manage authentication data used to authenticate access between two or more components during a test lifecycle. The authentication manager 310 may be configured to store and/or supply, upon request, one or more of: one or more user credentials (e.g., one or more logins and/or passwords); one or more public and/or private keys; one or more authentication tokens; and/or another form of authentication data or combination thereof Alternatively or additionally, the authentication manager 310 may be configured to rotate authentication data during a test lifecycle (e.g., according to a time-to-live (TTL) policy associated with a token and/or other authentication data). The authentication manager 310 may be configured to obtain one or more items of authentication data from a particular source location (e.g., a local or remote file path, which may be referred to as a "secret path"). The authentication manager 310 may obtain the source location from an environment variable (e.g., an environment variable obtained by an environment variable manager 306). Alternatively or in addition, the authentication manager 310 may be configured to use a default source location. The authentication manager 310 may be configured to use the default source location if an alternative environment variable is not available. The source location may correspond to a mounted path exposed by an authentication container 320 (described in further detail below). After obtaining authentication data, the authentication manager 310 may be configured to remove the authentication data from the source location (e.g., by calling a representational state transfer (REST) API in an authentication container 320 to remove the authentication data from the mounted path), to help protect the authentication data from exposure to unauthorized access. Alternatively or additionally, the authentication manager 310 may monitor the source location for new authentication data. Alternatively or additionally, the authentication manager 310 may access an authentication container 320's API to rotate authentication data (e.g., rotate credentials) and/or perform other authentication-related operations supported by the authentication container 320.

In an embodiment, the test container 302 includes executable test code 312. The test code 312 is configured to execute a test with support from one or more support containers. In addition, the test code 312 may rely on data and/or operations supplied by one or more other components of the test container 302 described herein. The test code 312 may be configured to write data to one or more designated endpoints, such as standard output, a default endpoint, an endpoint designated in an environment variable, and/or any other endpoint or combination thereof. The data may include, for example: log data (which may include metric-related data); object data (e.g., object data generated by the test code 312 as output of one or more test operations); diagnostic data; reporting data; and/or any other kind of data or combination thereof. Alternatively or additionally, the test code 312 may be configured to execute API calls to one or more support containers, to request and/or otherwise interact with support operations provided by the support container(s).

In an embodiment, the test container 302 includes a post-test exporter 314. The post-test exporter 314 is configured to export data to write data to one or more designated endpoints, to be used by one or more post-test operations. The designated endpoint may be standard output, a default endpoint, an endpoint designated in an environment variable, and/or any other endpoint or combination thereof.

In an embodiment, the container pod 300 includes one or more support containers. Support containers are containers that perform test support operations before, during, and/or after testing. A support container may interact with a test container 302 directly. Alternatively or additionally, a support container may perform test support operations without interacting directly with the test container 302. In an embodiment, the container pod 300 includes multiple support containers. One or more kinds of support containers may be mandatory, i.e., required for all test execution plans. Alternatively or additionally, one or more kinds of support containers may be optional, i.e., included in a test execution plan only when specified in user-supplied configuration data. Alternatively or additionally, one or more support containers may be perpetual, i.e., a particular instance of a support container may be used for more than one test.

In an embodiment, a container pod 300 includes a logging container 316. A logging container 316 is a support container configured to obtain log and/or metrics data from a test container 302. Specifically, the logging container 316 may be configured to obtain metric-related log data, generate one or more metrics based on the log data, and store the resulting metrics data. In an embodiment, the logging container 316 is mandatory.

In an embodiment, a container pod 300 includes a data container 318. The data container 318 is a support container configured to obtain object data to be used as input to one or more tests performed in the test container 302. The data container 318 may obtain the object data from a designated endpoint that implements a report object storage protocol. In addition, the data container 318 may be configured to store object data generated by the test container 302. The data container 318 may store the object data to a designated endpoint that implements a report object storage protocol. In an embodiment, the data container 318 is mandatory. Alternatively or additionally, the data container 318 may be a perpetual container. A perpetual data container 318 may reduce overhead associated with performing multiple tests, such as overhead associated with obtaining data from remote storage.

In an embodiment, a container pod 300 includes an authentication container 320, which may also be referred to as a "secret container." The authentication container 320 may be configured to obtain authentication data (e.g., one or more credentials, tokens, public and/or private keys, and/or another form of authentication data or combination thereof) from a location that stores authentication data (e.g., Hashicorp™ Vault, Amazon® Secret Manager, and/or another location or combination thereof that stores authentication data). The authentication container 320 may use a local file system's private key(s), a one-time token, and/or another authentication technique or combination thereof to obtain the authentication data. Alternatively or additionally, the authentication container 320 may expose an API (e.g., a REST API) to support authentication-related operations such as supplying authentication data to an authentication manager 310, deleting authentication data, rotating authentication data (e.g., rotating credentials), managing a location that stores authentication data, and/or another authentication-related operation or combination thereof. Using an authentication container 320 to manage authentication data and/or perform authentication-related operations may provide authentication features to a test container 302 while reducing exposure of authentication data to unauthorized access. In an embodiment, the authentication container 320 is mandatory.

In an embodiment, a container pod 300 includes a debugging container 322. The debugging container 322 is a support container configured to perform one or more debugging operations on the test code 312. Specifically, the debugging container 322 may share a process identifier (PID) namespace with the test container 302 and access the PID namespace to perform one or more debugging operations. The debugging container 322 may supply a user interface (e.g., a web console) configured to receive user input that directs debugging operations. In an embodiment, the debugging container 322 is optional.

In an embodiment, a container pod 300 includes a screen recording container 324. The screen recording container 324 is a support container configured to obtain and store screenshots and/or video corresponding to graphical user interface (GUI) output of the test container 302. The screen recording container 324 may be configured to obtain and store screenshots and/or video even if the test container 302 is running headless, i.e., not connected to any output device that would, if connected, permit a user to view the GUI output. In an embodiment, the screen recording container 324 is optional.

In an embodiment, the container pod 300 includes a performance monitoring container 326. The performance monitoring container 326 is configured to obtain and store data relating to performance of the test container 302. For example, the performance monitoring container 326 may be configured to obtain and store data relating to central processing unit (CPU) usage (i.e., virtual and/or physical CPU usage), memory usage, numbers and/or durations of specific processes executing in the test container 302, network usage (e.g., upload and/or download bandwidth usage, total bytes transferred, etc.), and/or any other kind of performance-related data or combination thereof.

2.4 User-Supplied Configuration Data

FIG. 4 illustrates user-supplied configuration data 400 in accordance with one or more embodiments. As illustrated in FIG. 4, user-supplied configuration data 400 includes a test configuration 402, a metric configuration 416, and various components thereof. In one or more embodiments, the user-supplied configuration data 400 may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, user-supplied configuration data 400 includes a test configuration 402. The test configuration 402 includes configurable properties used to orchestrate a particular test. In an embodiment, the test configuration 402 includes a name 404 of the test configuration 402. The name 404 may be a unique identifier. Alternatively or additionally, the test configuration 402 may include configuration data that identifies an entity for which the test is to be performed, such as a name 404, tenant identifier (ID) 406 (e.g., if the test orchestration service is a multi-tenant service), a group identifier (ID) 408, and/or any other kind of data used to identify an entity or combination thereof. Alternatively or additionally, the test configuration 402 may include testing instructions 410. The testing instructions 410 include instructions for executing the particular test code (e.g., test code 312) used in a particular test. Alternatively or additionally, the test configuration 402 may include operational instructions 412. The operational instructions 412 include properties used for scheduling and/or supervising a test job. Alternatively or additionally, the test configuration 402 may include extension instructions 414. Extension instructions 414 are instructions to enable and/or disable particular optional test features, such as optional support containers as described above.

The following table is a listing of properties for an example test configuration schema in accordance with an embodiment. In an embodiment, one or more properties are required, i.e., must be specified in the test configuration. Alternatively or additionally, one or more properties may not be required and may use a default value if not specified in the test configuration. Alternatively or additionally, one or more properties may be entirely optional (e.g., properties to use one or more optional support containers).

| Category | Property Name | Description | Required |
|---|---|---|---|
| Testing Instructions | Name | Name of the test configuration | Yes |
| | Tenant ID | Uniquely identifies a particular tenant | Yes |
| | Group ID | Uniquely identifies a particular group of users | Yes |

-continued

| Category | Property Name | Description | Required |
|---|---|---|---|
| | Input file configuration | Includes an endpoint address for obtaining input data | No (may use default) |
| | Output file configuration | Includes an endpoint address for storing output data | No (may use default) |
| | Object storage configuration | Configuration property/ies for obtaining and/or storing data | No (may use default) |
| | Metric agent type | One of multiple types of metric agent used to transmit metrics from the test container | No (may use default) |
| | Metric agent configuration | Configuration property/ies used by the metric agent | No (may use default) |
| | Logging agent type | One of multiple types of logging agent used to transmit log data from the test container | No (may use default) |
| | Logging agent configuration | Configuration property/ies used by the logging agent | No (may use default) |
| | Authentication agent type | One of multiple types of authentication agent used to obtain authentication data | No (may use default) |
| | Authentication agent configuration | Configuration property/ies used by the authentication agent | No (may use default) |
| | Test container | Address and/or unique identifier of a container image that encapsulates the test environment | Yes |
| | Container runtime configuration | Configuration property/ies used when initializing and/or starting the test container | No (may use default) |
| Operational Instructions | Affinity configuration | Dynamic selection of a test orchestration agent | No (may use default) |
| | Maximum duration | Maximum duration (a.k.a. "living time") of a test job | Yes |
| | Execution pool | Identifies an execution pool to use for a test | No (may use default) |
| | CPU requirement | Runtime CPU availability requirement. May be designated as burstable, guaranteed, or best effort. | No (may use default) |
| | Memory requirement | Runtime memory requirement. May be designated as burstable, guaranteed, or best effort. | No (may use default) |
| | Debug configuration | Property/ies to configure a debugging container | Optional |
| | Performance monitoring configuration | Property/ies to configure a performance monitoring container | Optional |
| Extension Instructions | Screen recording configuration | Property/ies to configure a screen recording container | Optional |
| | Snapshot configuration | Property/ies to configure a snapshot container that takes snapshots of test container state(s) at particular time(s) | Optional |
| | Reusable container configuration | Property/ies to allow the test container to be used for more than one test | Optional |

In an embodiment, user-supplied configuration data 400 includes a metric configuration 416. The metric configuration 416 includes configuration data used to obtain and process metric-related data from a test container. In an embodiment, the metric configuration 416 includes a regular expression 418. The regular expression 418 defines a schema for parsing log data to obtain metric data. Specifically, the regular expression 418 may include field definitions for parsing log entries into JavaScript Object Notation (JSON) data structures. Alternatively or additionally, a metric configuration 416 may include one or more key-value mappings 420. A key-value mapping 420 is a mapping of one or more specific log entry fields to corresponding metric(s).

The following table is a listing of properties for an example metric configuration schema in accordance with an embodiment. In an embodiment, one or more properties are required, i.e., must be specified in the metric configuration. Alternatively or additionally, one or more properties may not be required and may use a default value if not specified in the metric configuration. Alternatively or additionally, one or more properties may be entirely optional.

| Property Name | Description | Required |
|---|---|---|
| Regular Expression | Regular expression to parse a log entry into JSON | Yes |
| Time Key | Field key from which to obtain the log entry time. If not specified, the parse time may be used. | No |
| Time Format | Format of the log entry time. If not specified, a default parser may be used. | No |
| Metric Name(s) | Template for identifying field(s) that include one or more metric variables and/or constants. Multiple metric names may be specified in an array. | Yes |
| Metric Value(s) | Template for retrieving metric value(s) from JSON data | Yes |

As an example, in an embodiment, a metric configuration includes the following regular expression and associated configuration data:

| | |
|---|---|
| REGULAR EXPRESSION | (\s*\[(?<logtime>[^\]]*)\])?\s*(?<record_name>\w*) (?<record_verb>\w*) (?<record_code>\d*) |
| TIME KEY | logtime |
| TIME FORMAT | %Y-%m-%d %H:%M:%S %z |

In addition, in this example, the metric configuration includes the following key-value mapping:

| | |
|---|---|
| METRIC NAME | service.{record_name}.{record_verb} |
| METRIC VALUE | {record_code} |

In this example, the following log entry is received:

[2018-09-27 12:00:0-700] loginpage responsecode 404

Applying the regular expression generates the following JSON data structure:

```
{
    "TIME": "1538074800",
    "RECORD": {
        "NAME" : "loginpage",
        "VERB": "responsecode",
        "CODE" : 404
    }
}
```

Applying the key-value mapping generates the following metric data:

1538074800: service.loginpage.responsecode=404

3. PREPARING FOR TEST ORCHESTRATION

Figure 5:
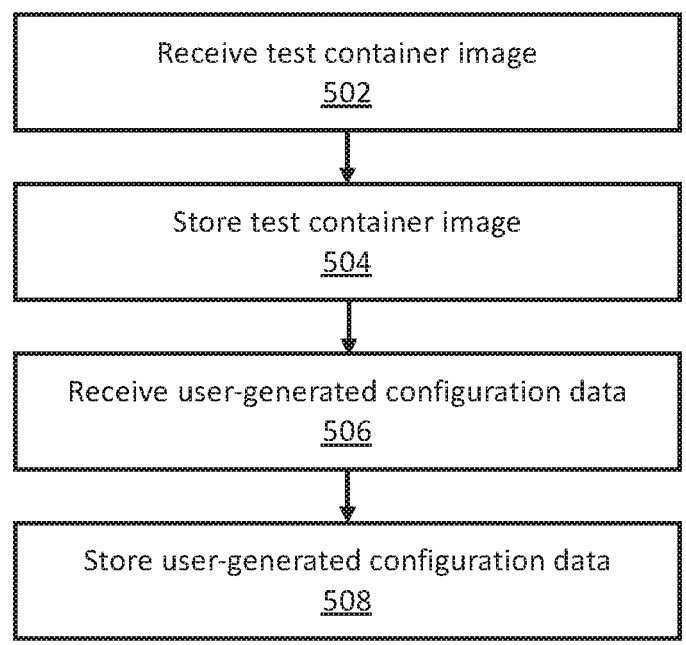
FIG. 5 illustrates a set of operations for preparing for test orchestration in accordance with one or more embodiments.

FIG. 5 illustrates an example set of operations for preparing for test orchestration in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a system (e.g., system 100 of FIG. 1) receives a test container image (Operation 502) that encapsulates a test environment to be used for one or more tests. The system stores the test container image (Operation 504). In an embodiment, the system stores the test container image in persistent storage, to be retrieved on demand when specified in user-supplied configuration data.

In an embodiment, the system receives user-generated configuration data (Operation 506). The user-generated configuration data specifies properties that apply to one or more tests. As described above, the user-generated configuration data may include a test configuration and/or a metric configuration. The system stores the user-generated configuration data (Operation 508). In an embodiment, the system stores the user-generated configuration data in persistent storage, to be retrieved on demand in response to a test request.

4. DISPATCHING A TEST REQUEST

Figure 6:
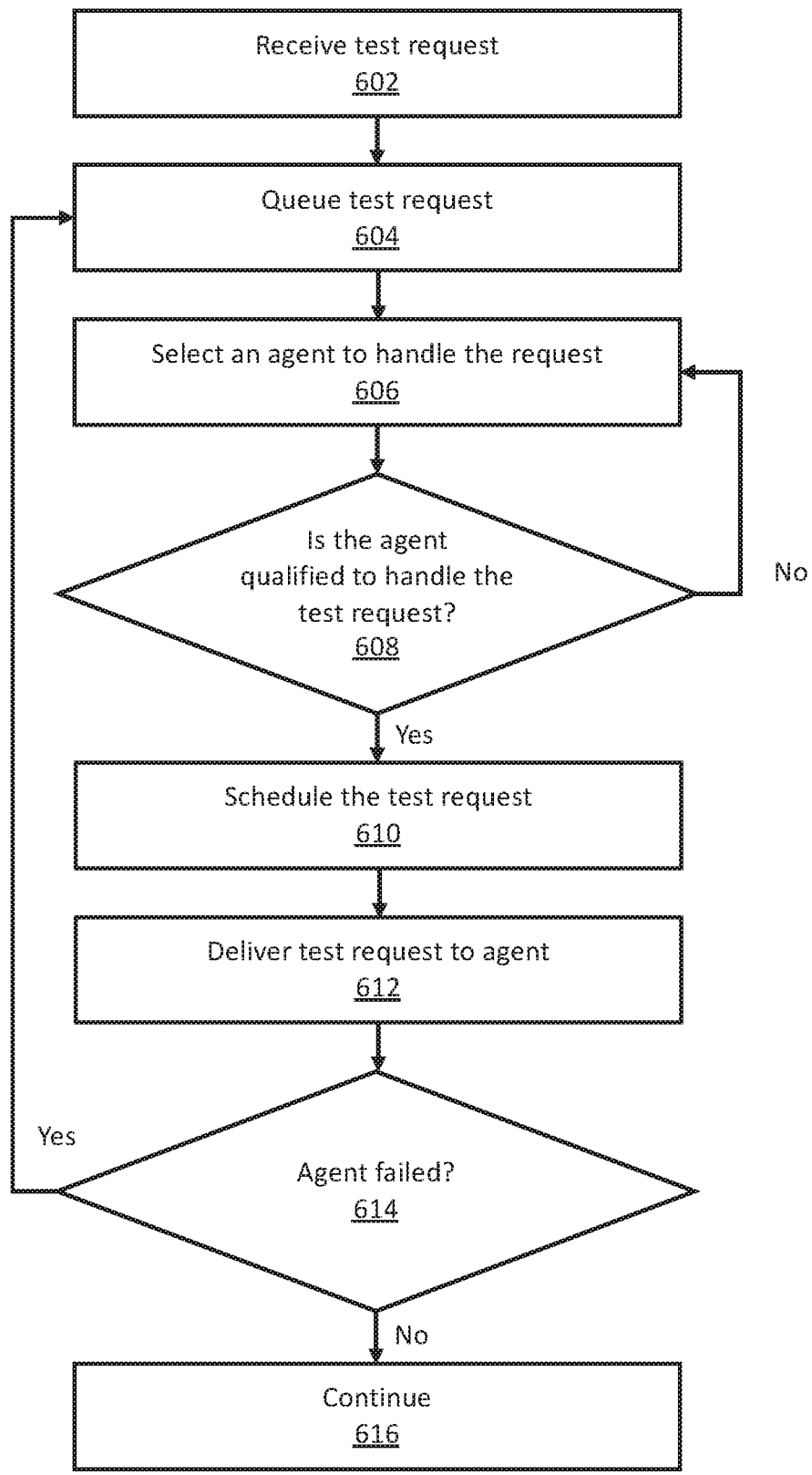
FIG. 6 illustrates a set of operations for dispatching a test request in accordance with one or more embodiments.
Figure 7A:
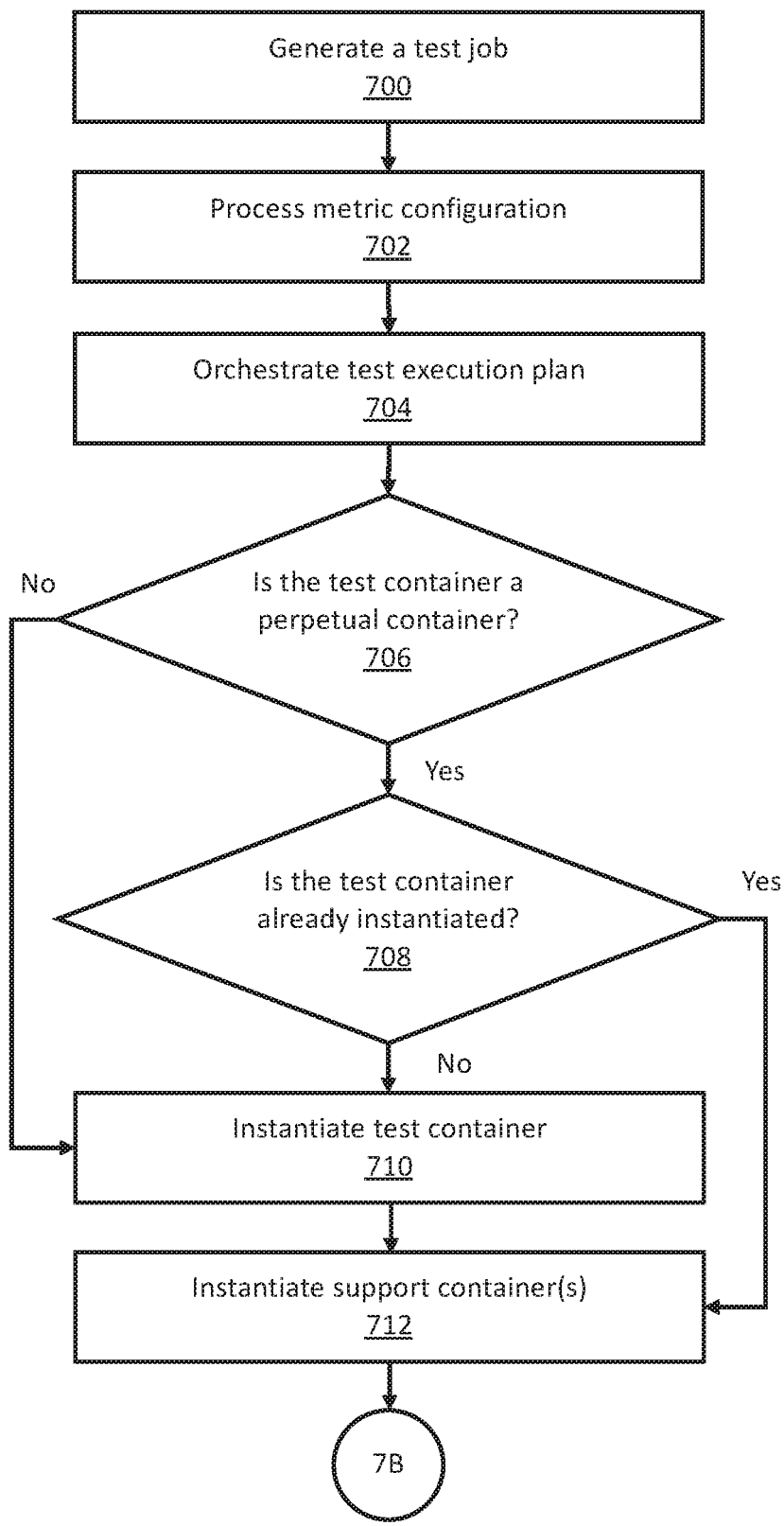
FIGS. 7A-7D illustrate a set of operations for test orchestration in accordance with one or more embodiments.
Figure 7B:
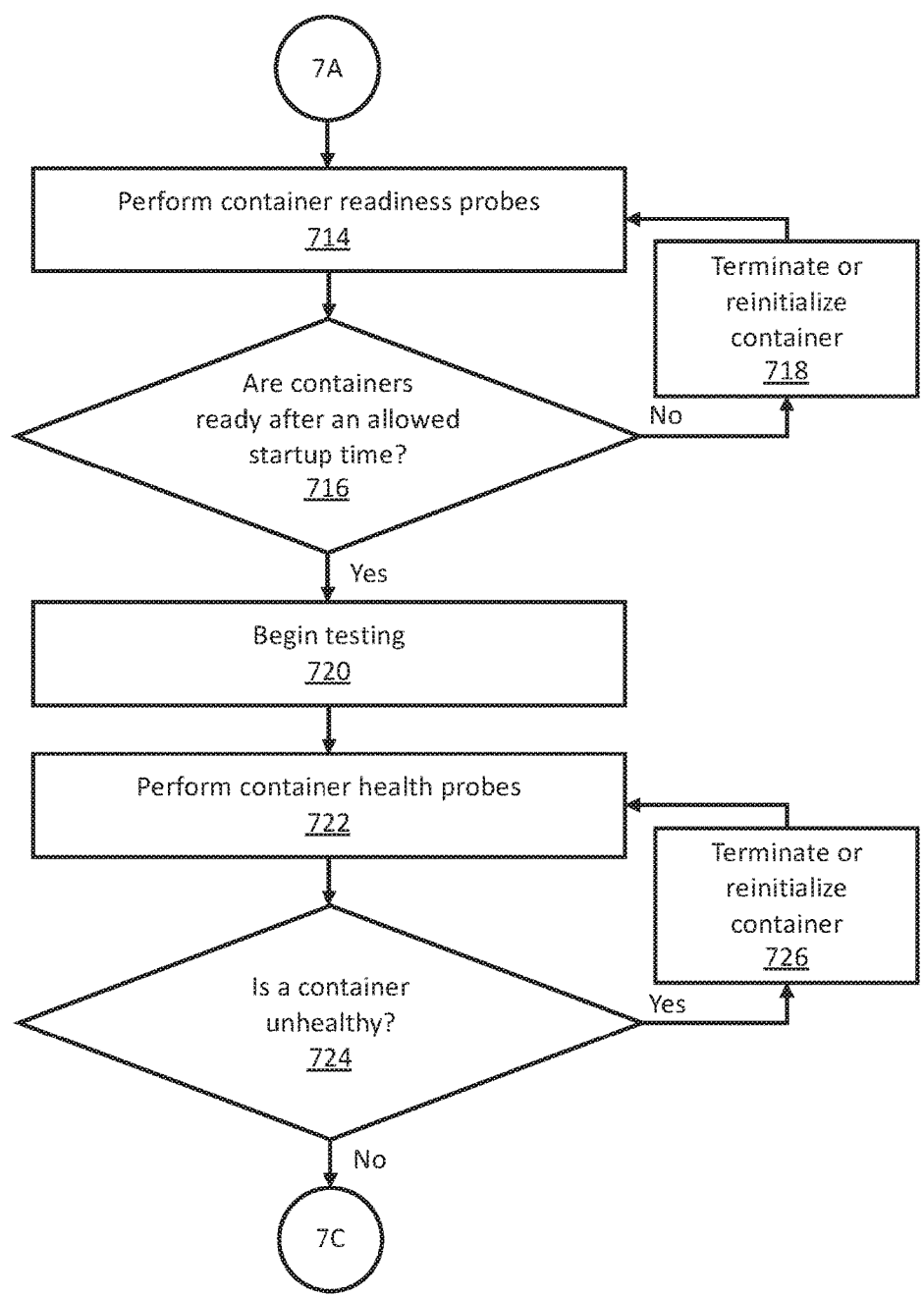
Figure 7C:
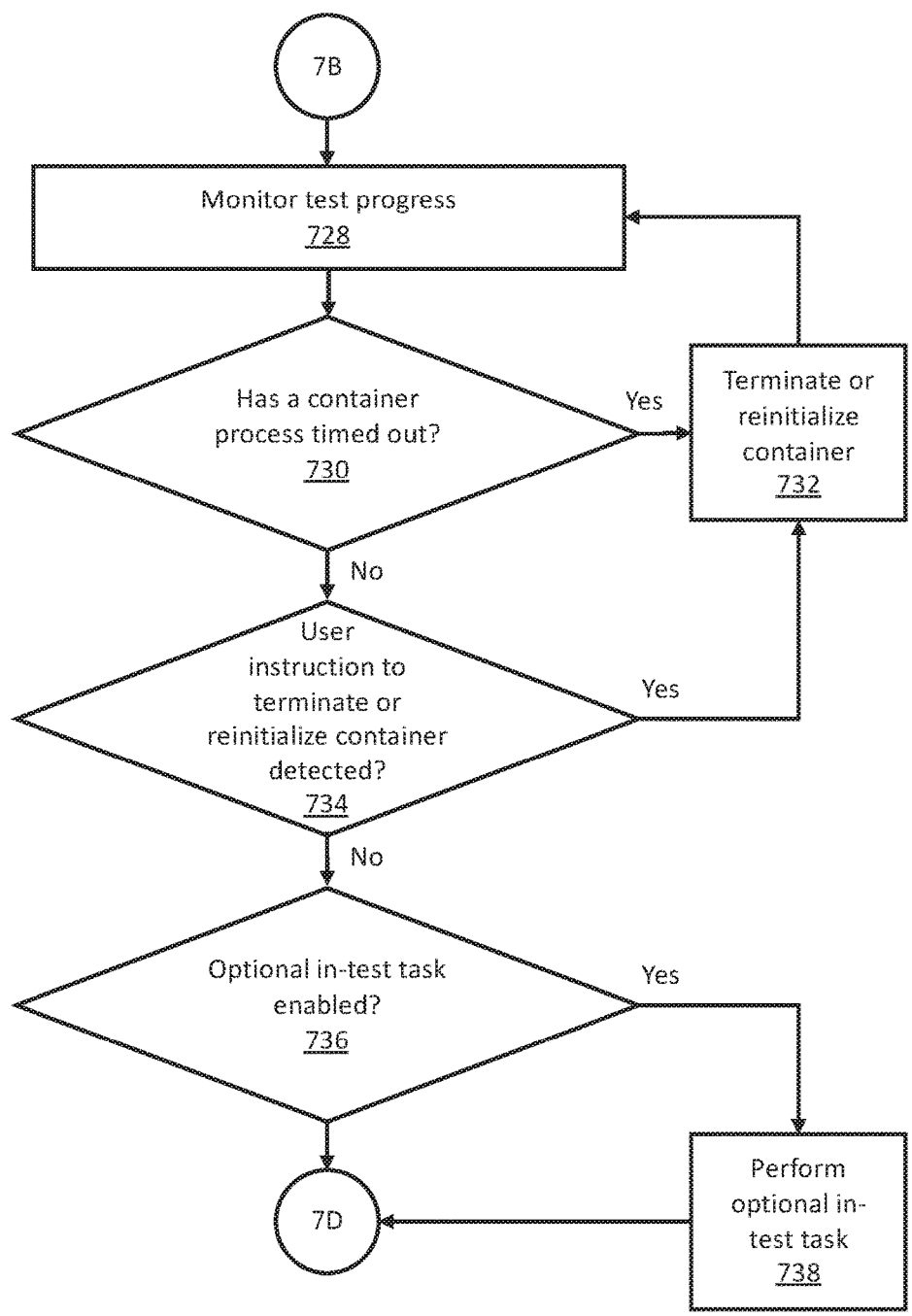
Figure 7D:
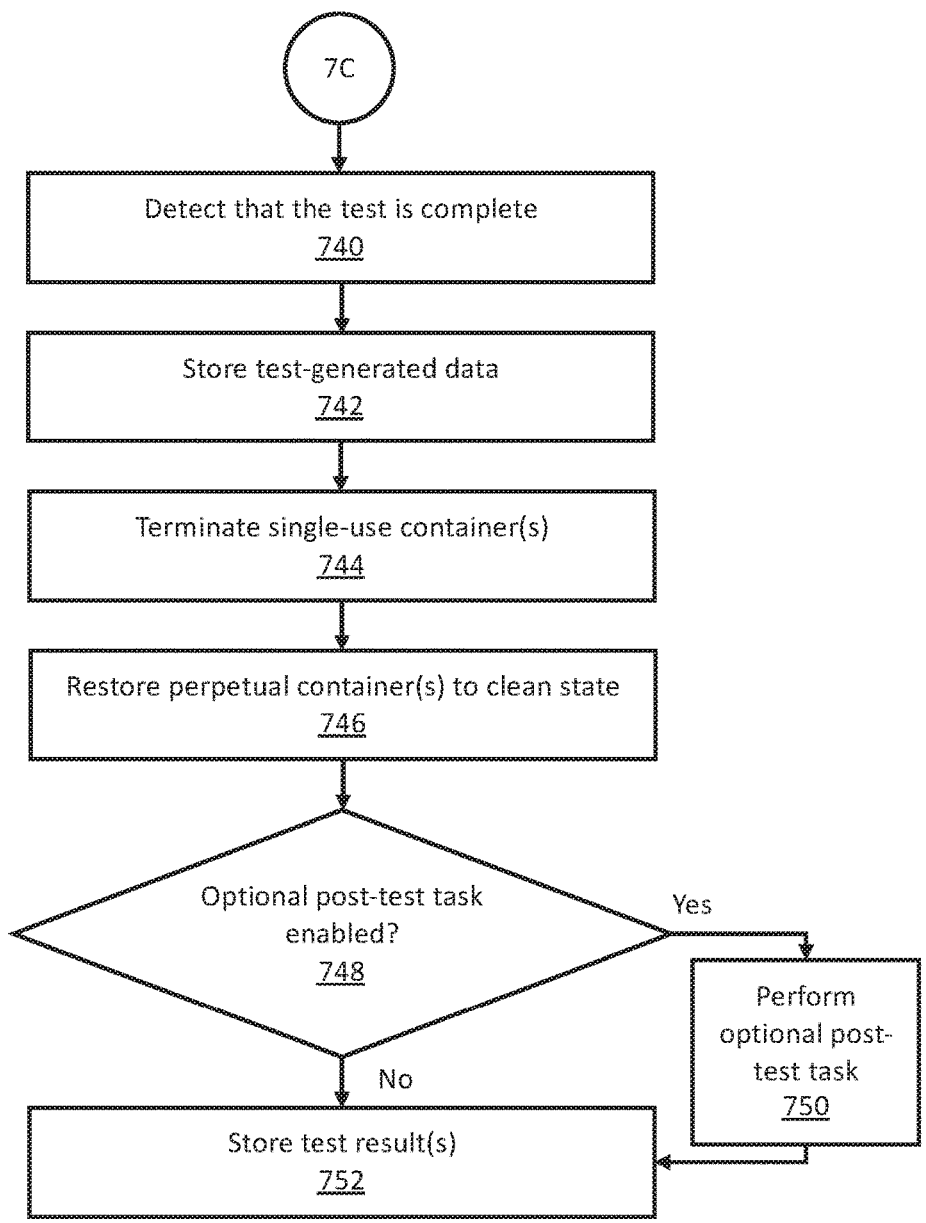

FIG. 6 illustrates an example set of operations for dispatching a test request in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, a system (e.g., system 100 of FIG. 1) receives a test request (Operation 602). The test request includes properties indicating a particular test to perform. Specifically, the test request may designate a particular test configuration to use for the test. Alternatively or additionally, the test request may designate a particular metric configuration to use for the test.

In an embodiment, the system queues the request (Operation 604). Before queuing the request, the system may assign a unique identifier to the request, for tracking purposes. In an embodiment, the system queues the request in a particular queue partition, as described above.

In an embodiment, the system selects a test orchestration agent (for ease of discussion, referred to here as "agent") to handle the request (Operation 606). The system may select the agent from one or more pools of available agents. The system may select the agent based on a load balancing policy. Different agents may be associated with different sets of underlying hardware, and a load balancing policy may be based on resource availability in each set of underlying hardware. For example, a load balancing policy may be based on CPU usage, memory availability, and/or any other kind of resource availability or combination thereof.

In an embodiment, the system performs a qualification check to confirm that the selected agent is qualified to handle the test request (Operation 608). The qualification check may confirm that the agent has sufficient resources available to service the request. In an embodiment, the system assigns a weighted score to the agent based on the agent's current status, such as a number of test jobs already being handled by the agent, a maximum test job capacity, CPU usage, memory usage, and/or any other kind of status associated with the agent or combination thereof. If the agent fails the qualification check (e.g., if the weighted score does not satisfy a threshold score requirement), then the system may select a different agent (Operation 606).

In an embodiment, the system schedules the test request (Operation 610). As used herein, scheduling allocates one or more resources to the request. Specifically, the system may transmit the request to the selected agent. In an embodiment, the system determines whether the agent has successfully retrieved the request (Operation 614). If the agent fails to retrieve the request, then the system may requeue the test request to be dispatched to another agent. If the agent successfully retrieves the request, then the system continues to process the request (Operation 616).

5. TEST ORCHESTRATION

FIGS. 7A-7D illustrate an example set of operations for test orchestration in accordance with one or more embodiments. One or more operations illustrated in FIGS. 7A-7D may be modified, rearranged, or omitted all together. Accordingly, the particular sequence of operations illustrated in FIGS. 7A-7D should not be construed as limiting the scope of one or more embodiments.

In an embodiment, a system (e.g., system 100 of FIG. 1) generates a test job (Operation 700). Generating a test job instantiates the test job based on a test request and one or more properties in user-supplied configuration data (e.g., a test configuration). Before, during, and/or after testing, if a task fails, the system may retry that task. If a critical task fails and any retries is/are not successful, the system may fail the entire test job. Alternatively or additionally, as tasks complete, the system may update the status of the test job to indicate that the task was completed.

In an embodiment, the system processes a metric configuration (Operation 702) to be used for the test job. Specifically, the system may generate a configuration file based on the metric configuration and transmit the configuration file to a logging container, to be used in parsing log data and/or generating metrics based on log data.

In an embodiment, the system orchestrates a test execution plan (Operation 704). Orchestrating a test execution plan may generate instructions for instantiating and/or starting a test container. The specific instructions may be based on the container platform(s) being used. Alternatively or additionally, orchestrating a test execution plan may generate instructions corresponding to operations to be performed in different test phases (e.g., pre-test, in-test, and/or post-test). Alternatively or additionally, orchestrating a test execution plan may generate one or more property files, based on a test request and/or user-supplied configuration data, to be used by a test container and/or one or more support containers during one or more test phases. Examples of orchestrating a test execution plan are described below.

In an embodiment, the system determines whether the test container to be used in the test is a perpetual container (Operation 706). If the test container is not a perpetual container (i.e., the test container is a single-use container, also referred to as an ephemeral container), then the system instantiates the test container (Operation 710). Specifically, the system may generate an instance of the test container image specified in the user-supplied configuration data. In an embodiment, if the test container is a perpetual container, then the system determine whether the test container is already instantiated (Operation 708). For example, the test container may have been instantiated for an earlier test. If the test container is not already instantiated, then the system instantiates the test container (Operation 710).

In an embodiment, the system instantiates one or more support containers (Operation 712). Specifically, the system may instantiate any mandatory support containers and any optional support containers designated in user-supplied configuration data. If a support container is a perpetual container, then the system may instantiate that support container only if an instance of the support container is not already available.

In an embodiment, the system performs one or more container readiness probes (Operation 714). A container readiness probe verifies that a container is in a ready state to begin testing. As one example, a data sidecar readiness probe may verify that the data sidecar has obtained any specified input data and the input data is available for use by the test container. As another example, a debugging container readiness probe may verify that the debugging user interface (e.g., a web shell, as described above) is accessible. As another example, a perpetual container readiness probe may verify that a perpetual support container is in a healthy state. Many different kinds of readiness probes may be performed.

In an embodiment, the system checks whether one or more containers are ready after an allowed startup time (Operation 716). The allowed startup time may correspond to a maximum expected time to instantiate the container and/or execute any startup code within the container. If a container is not ready after the allowed startup time, then the system may terminate or reinitialize the container (Operation 714).

In an embodiment, the system begins testing (Operation 720). Specifically, the system begins executing test code in the test container. As described herein, one or more support containers may perform operations while the test code is executing.

In an embodiment, during testing, the system performs one or more container health probes (Operation 722). A container health probe verifies that a test container is instantiated and operational. If the system determines that a container is unhealthy (Operation 724), then the system may terminate or reinitialize the container (Operation 726).

In an embodiment, during testing, the system monitors test progress (Operation 728). Monitoring test progress verifies that processes within the test container and/or support container(s) are executing properly. If the system determines that a container process times out (Operation 730), then the system may terminate or reinitialize the container. Alternatively or additionally, if the system receives a user instruction (e.g., user input via a user interface) to terminate or reinitialize a container (Operation 734), then the system may terminate or reinitialize the container as instructed (Operation 732).

In an embodiment, during testing, the system determines whether one or more optional in-test tasks are enabled (Operation 736). The system may determine that an optional in-test task is enabled based on user-supplied configuration data. If an optional in-test task is enabled, then the system performs the optional in-test task (Operation 738). As one example, if performance monitoring is enabled, then a performance monitoring container may periodically obtain resource usage data from the test container. As another example, if screen recording is enabled, then a screen recording container may record user interface output from the test container.

In an embodiment, the system detects that the test is complete (Operation 740). Specifically, the system may detect that test code has finished executing in the test container. The test container may transmit a message to the test orchestration service and/or one or more support containers indicating that the test is complete.

In an embodiment, the system stores test-generated data (Operation 742), i.e., object data generated as output of the test code. The system may store the test-generated data during testing and/or after the test is complete. To store the test-generated data, a data container may execute a remote storage protocol to upload the data to a designated storage location. The data container may monitor the upload until all the data is stored successfully.

In an embodiment, when testing is complete, the system terminates any single-use container(s) (Operation 744). Alternatively or additionally, the system may restore any perpetual container(s) to a clean state (Operation 746), to prepare the perpetual container(s) for a subsequent test. The system may execute a cleanup script in a perpetual container to restore the container to a clean state.

In an embodiment, during testing, the system determines whether one or more optional post-test tasks are enabled (Operation 748). The system may determine that an optional post-test task is enabled based on user-supplied configuration data. If an optional post-test task is enabled, then the system performs the optional post-test task (Operation 750). As one example, if debugging is enabled, a debugging container may generate a post-test debugging report.

In an embodiment, the system stores one or more test results (Operation 752). Storing a test result may update a test job status at the test orchestration service (e.g., by calling an internal API of the test orchestration service). The test orchestration service may store the test job status in persistent storage, making the test job status available for future queries and/or data analysis.

6. ILLUSTRATIVE EXAMPLES

Detailed examples are described below for purposes of clarity. Components and/or operations described below should be understood as specific examples which may not be applicable to certain embodiments. Accordingly, components and/or operations described below should not be construed as limiting the scope of any of the claims.

6.1 Single-Use Container

In this example, the following test request in YAML Ain't Markup Language (YAML) format designates a test configuration specifying that the test container is a single-use container.

```
test_request:
    test_properties:
        test_suite: api_sanity
        api_version: v1.0
        target_ep: https://phx-dev:9000
    orch_params:
        tenant: platform-dev
        group: api-test
        max_duration: 60m
        schedule_strategy:
            retry_times: 5
        import_data:
            url: s3://tpaas-internal/upload/platform-test-data
        slack_integ: true
    test_configuration: platform_api_test
    metric_list:
    - control_msg
    - verb_record
```

Based at least on the test request and the test configuration, the system generates the following test execution plan in YAML format. In this example, "[Container Domain]" would be replaced with the domain that hosts the container image.

```
orchestration_model:
    pre_test_container:
    - container: [Container Domain]/vault:v1
        name: secret
        volume: /var/run
        config_yaml: /run/753cf80d.vault.yaml
    - container: [Container Domain]/casper:v1
        name: data
        import_path: /systemtests/import
        import_data: {"url": "s3://tpaas-
internal/upload/platform-test-data",
"access_token":"/var/run/753cf80d.capser"}
        export_path: /systemtests/export
        export_data: {"url": "s3://tpaas-internal/download/",
"access_token":"/var/run/753cf80d.capser"}
    - container: [Container Domain]/telemetry:v1
        name: metric
        log_path: /systemtests/logs/
        config_yaml: /var/run/753cf80d.telemetry.yaml
        map_port:
        - 24224
    - container: [Container Domain]/chainsaw2:v1
        name: logging
        log_path: /systemtests/logs/
        config_yaml: /var/run/753cf80d.chainsaw.yaml
    pre_test_tasks:
    - task_type: readiness_checker
        container: data
        check_path: /systemtests/import/
        timeout: 1m
    - task_type: readiness_probe
        container: logging
        grep_file:
            log_file: /var/log/lumberjack.log
            keyword: ready
        timeout: 20s
        delay: 5s
    - task_type: readiness_probe
        container: metric
        check_port: 9224
        timeout: 20s
        delay: 5s
    test_container:
        test_property_file: /tmp/753cf80d.properties.yaml
        test_metadata:
            test_id: 753cf80d
            test_platform_ep: http://tpaas.internal:9000
        cpu:
            request: 2
            qos_level: guaranteed
        memory:
            limit: 1024m
            qos_level: burstable
        volumes_mount:
        - data:/systemtests/import
        - data:/systemtests/export
        - logging:/systemtests/log
        pid_ns_sharing: null
        network_ns_sharing: container:metric
        log_driver:
        - server:
            port: metric:24224
    in_test_tasks:
    - task_type: liveness_probe
        container: test_container
        interval: 5s
        max_seq_failures: 3
    - task_type: test_sync
        max_duration: 60m
    post_test_tasks:
    - task_type: container_execute
        container: data
        command: /systemtests/start-upload.sh
        timeout: 1m
    - task_type: container_kill
        dep: container_execute[0]
        containers:
        - test
        - secret
        - data
        - logging
        - metric
    - task_type: external_trigger
        - SlackBot
            hookUrl: https://slackbot.internal
            params:
                test_id: 753cf80d
                rule: on_workflow_failure
```

6.2 Single-Use Container with Debugging Enabled

In this example, the following test request in YAML format designates a test configuration specifying that the test container is a single-use container. In addition, the test request includes properties (bolded here for illustrative purposes only) specifying that debugging is enabled for the test.

```
test_request:
    test_properties:
        test_suite: api_sanity
        api_version: v1.0
        target_ep: https://phx-dev:9000
```

```
        orch_params:
            tenant: platform-dev
            group: api-test
            max_duration: 60m
            schedule_strategy:
                    retry_times: 5
            import_data:
                    url: s3://tpaas-internal/upload/platform-test-data
            debug: true
            webshell_debug: true
            vnc_debug: true
        test_configuration: platform_api_test
        metric_list:
        - control_msg
        - verb_record
```

Based at least on the test request and the test configuration, the system generates the following test execution plan in YAML format. In this example, "[Container Domain]" would be replaced with the domain that hosts the container image.

```
orchestration_model:
    pre_test_container:
    - container: [Container Domain]/vault:v1
            name: secret
            volume: /var/run
            config_yaml: /run/753cf80d.vault.yaml
    - container: [Container Domain]/casper:v1
            name: data
            import_path: /systemtests/import
            import_data: {"url": "s3://tpaas-
internal/upload/platform-test-data",
"access_token":"/var/run/753cf80d.capser"}
            export_path: /systemtests/export
            export_data: {"url": "s3://tpaas-internal/download/",
"access_token":"/var/run/753cf80d.capser"}
    - container: [Container Domain]/telemetry:v1
            name: metric
            log_path: /systemtests/logs/
            config_yaml: /var/run/753cf80d.telemetry.yaml
            map_port:
            - 24224
    - container: [Container Domain]/chainsaw2:v1
            name: logging
            log_path: /systemtests/logs/
            config_yaml: /var/run/753cf80d.chainsaw.yaml
    - container: [Container Domain]/vnc_n_webshell:v1
            name: debug
            ns_sharing: container:metric
            map_port:
            - 8080
            - 5900
            endpoint:
            - http://:8080/web_shell
            - http://:8082/web_vnc
            export_var:
            - DEBUG_DISPLAY: 5900
    pre_test_tasks:
    - task_type: readiness_checker
            container: data
            check_path: /systemtests/import/
            timeout: 1m
    - task_type: readiness_probe
            container: logging
            grep_file:
                    log_file: /var/log/lumberjack.log
                    keyword: ready
            timeout: 20s
            delay: 5s
    - task_type: readiness_probe
            container: metric
            check_port: 9224
            timeout: 20s
            delay: 5s
        test_container:
            interactive: true
            test_property_file: /tmp/753cf80d.properties.yaml
            test_metadata:
                    test_id: 753cf80d
                    test_platform_ep: http://tpaas.internal:9000
            cpu:
                    request: 2
                    qos_level: guaranteed
            memory:
                    limit: 1024m
                    qos_level: burstable
            volumes_mount:
            - data:/systemtests/import
            - data:/systemtests/export
            - logging:/systemtests/log
            pid_ns_sharing: container:debug
            network_ns_sharing: container:metric
            log_driver:
            - server:
                        port: metric:24224
            in_test_tasks:
            - task_type: liveness_probe
                        container: test_container
                        interval: 5s
                        max_seq_failures: 3
    - task_type: test_sync
            max_duration: 60m
    - task_type: debug_daemon
    post_test_tasks:
            - task_type: container_execute:
                        container: data
                        command: /systemtests/start-upload.sh
                        timeout: 1m
    - container_kill:
            dep: container_execute[0]
            containers:
            - test
            - secret
            - data
            - logging
            - metric
            - debug
```

Based on the above test execution plan, the system instantiates a debugging container using the container image "vnc_n_webshell." The debugging container shares the same network namespace as a metric container. The test container has access to the interface started on debug container. In addition, an endpoint parameter for the debugging container specifies a reverse proxy of a hypertext transfer protocol (HTTP) endpoint. A user may access the endpoint during test execution. When the system instantiates the test container, the system instantiates the test container as "interactive." The test container shares a PID namespace with the debugging container, providing the debugging container access to processes running in test container. In addition, the in-test task list includes a debug daemon task. The debug daemon tasks executes a debug daemon process inside the test container, enabling access to the test container's root file system. The daemon process also monitors debug progress and user-initiated debugging actions. In addition, the debugging container is added to the post-test container cleanup list.

6.3 Perpetual Container

In this example, the following test request in YAML format designates a test configuration specifying that the test container is a perpetual container.

```
test_request:
    test_properties:
        test_suite: api_sanity
        api_version: v1.0
        target_ep: https://phx-dev:9000
    orch_params:
        tenant: platform-dev
        group: api-test
        max_duration: 60m
        schedule_strategy:
            retry_times: 5
        import_data:
            url: s3://tpaas-internal/upload/platform-test-data
    commands:
        health_command: /systemtests/health.sh
        test_command: /systemtests/test.sh
        cleanup_command: /systemtests/cleanup.sh
    test_configuration: platform_api_test_perpetual
    metric_list:
    - control_msg
    - verb_record
```

Based at least on the test request and the test configuration, the system generates the following test execution plan in YAML format. In this example, "[Container Domain]" would be replaced with the domain that hosts the container image.

```
orchestration_model:
    pre_test_container:
    - container: [Container Domain]/vault:v1
            name: secret
            volume: /var/run
            config_yaml: /run/753cf80d.vault.yaml
    - container: [Container Domain]/casper:v1
            name: data
            import_path: /systemtests/import
            import_data: {"url": "s3://tpaas-
internal/upload/platform-test-data",
"access_token":"/var/run/753cf80d.capser"}
            export_path: /systemtests/export
            export_data: {"url": "s3://tpaas-internal/download/",
"access_token":"/var/run/753cf80d.capser"}
    - container: [Container Domain]/telemetry:v1
            name: metric
            log_path: /systemtests/logs/
            config_yaml: /var/run/753cf80d.telemetry.yaml
            map_port:
            - 24224
    - container: [Container Domain]/chainsaw2:v1
            name: logging
            log_path: /systemtests/logs/
            config_yaml: /var/run/753cf80d.chainsaw.yaml
    pre_test_tasks:
    - task_type: readiness_checker
            container: data
            check_path: /systemtests/import/
            timeout: 1m
    - task_type: readiness_probe
            container: logging
            grep_file:
                    log_file: /var/log/lumberjack.log
                    keyword: ready
            timeout: 20s
            delay: 5s
    - task_type: readiness_probe
            container: metric
            check_port: 9224
            timeout: 20s
            delay: 5s
    - task_type: healthcheck
            container: test
            command: /systemtests/healthcheck.sh
    test_container:
            reuse: true
            test_property file: /tmp/753cf80d.properties.yaml
            test_metadata:
                    test_id: 753cf80d
                    test_platform_ep: http://tpaas.internal:9000
            cpu:
                    request: 2
                    qos_level: guaranteed
            memory:
                    limit: 1024m
                    qos_level: burstable
            volumes_mount:
            - data:/systemtests/import
            - data:/systemtests/export
            - logging:/systemtests/log
            pid_ns_sharing: null
            network_ns_sharing: container:metric
            log_driver:
            - server:
                    port: metric:24224
    in_test_tasks:
    - task_type: liveness_probe
            container: test_container
            interval: 5s
            max_seq_failures: 3
    - task_type: test_sync
            max_duration: 60m
    - task_type: exec_process
            command: /systemtests/test.sh
    post_test_tasks:
    - task_type: container_execute:
            container: data
            command: /systemtests/start-upload.sh
            timeout: 1m
    - task_type: cleanup_exec
            dep: container_execute[0]
            command: /systemtests/cleanup.sh
    - task_type: cleanup_container
            - container_kill:
                    enable: cleanup_exec_return_code ||
healthcheck.return_code
                    dep: container_execute[1]
                    containers:
                    - test
                    - secret
                    - data
                    - logging
                    - metric
```

Based on the above test execution plan, the system performs a pre-test health check to ensure that the test container is ready to run the next test. If the health check fails, the system skips to a container cleanup task to remove unhealthy containers and rerun the orchestration. When creating the test container, the system does not create a new container if an existing container is present and healthy. However, the system does load test metadata and a property file into the existing test container. During in-test tasks, an 'exec_process' executes the 'run test' command and signals the 'test_sync' task on completion. During post-test tasks, the system executes an additional cleanup procedure, before container cleanup. If the 'cleanup_exec' and previous health check task are successful, then the system disables container cleanup so that the test container can be reused for a subsequent test.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are perpetually programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
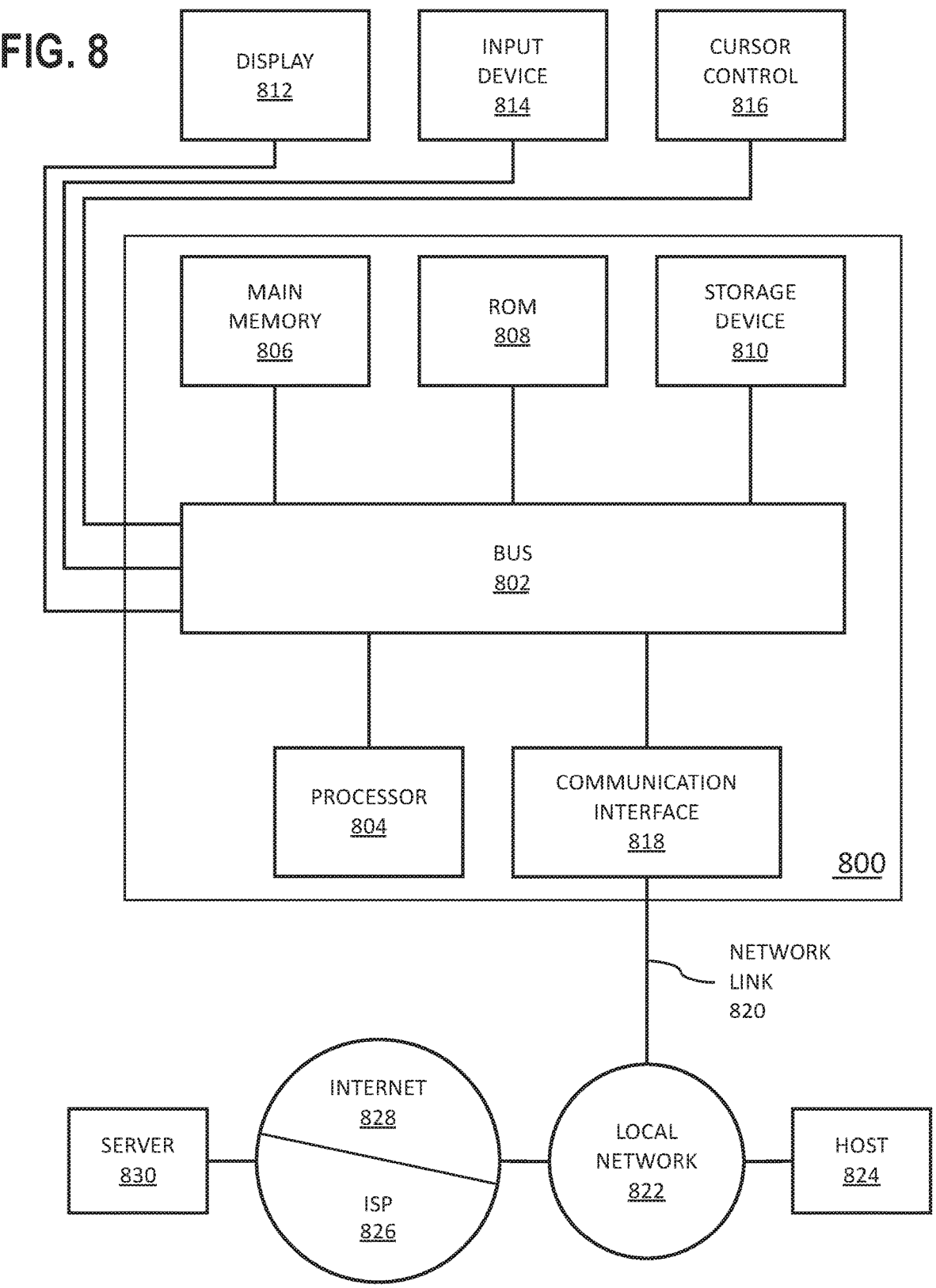
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device for displaying information to a computer user. An input device 814, including alphanumeric and other keys, may be coupled to bus 802 for communicating information and command selections to processor 804. Alternatively or in addition, the computer system 800 may receive user input via a cursor control 816, such as a mouse, a trackball, a trackpad, a touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The display 812 may be configured to receive user input via one or more pressure-sensitive sensors, multi-touch sensors, and/or gesture sensors. Alternatively or in addition, the computer system 800 may receive user input via a microphone, video camera, and/or some other kind of user input device (not shown).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 800 can receive the data from the network and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9. COMPUTER NETWORKS AND CLOUD NETWORKS

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    executing a plurality of test execution plans using: instances of a same first container image that encapsulates a first test environment; and instances of at least two different test support container images that are specified by different user-defined test configurations and each configured to perform, respectively, one or more test support operations, wherein executing the plurality of test execution plans comprises:
    (a) based at least on a first user-defined test configuration, executing a first test execution plan comprising:
        generating a first test container comprising a first instance of the first container image that encapsulates the first test environment;
        generating a first test support container configured to supply input data to the first instance of the first container image and obtain output data from the first instance of the first container image during a first test;
        wherein the first test container and the first test support container are encapsulated reproducible software modules that may be executed on one or more container platforms;
        executing the first test container and the first test support container on a first container platform to perform the first test in the first test environment according to the first user-defined test configuration;
    (b) based at least on a second user-defined test configuration, executing a second test execution plan comprising:
        generating a second test container comprising a second instance of the first container image that encapsulates the first test environment;
        generating a second test support container that is specified in the second user-defined test configuration and configured to perform at least a first test support operation, wherein the second test support container is different from any test support container specified in the first user-defined test configuration;
        wherein the second test container and the second test support container are reproducible software modules that may be executed on the one or more container platforms;

executing the second test container and the second test support container on a second container platform to perform a second test in the first test environment according to the second user-defined test configuration.

2. The one or more media of claim 1, wherein executing the first test execution plan is orchestrated by a particular test orchestration agent of a plurality of test orchestration agents.

3. The one or more media of claim 2, further storing instructions which, when executed by one or more processors, cause:
receiving a request to perform the first test;
storing the request in a test request queue;
dispatching the request to the particular test orchestration agent.

4. The one or more media of claim 2, further storing instructions which, when executed by one or more processors, cause:
selecting the particular test orchestration agent based at least on a load balancing policy associated with the plurality of test orchestration agents.

5. The one or more media of claim 4, wherein the plurality of test orchestration agents are distributed across a plurality of hardware systems and the load balancing policy is based at least on availability of one or more system resources in the plurality of hardware systems.

6. The one or more media of claim 5, wherein availability of the one or more system resources comprises central processing unit (CPU) usage and free memory size.

7. The one or more media of claim 2, further storing instructions which, when executed by one or more processors cause:
generating, by the particular test orchestration agent, the first test execution plan based at least on the first user-defined test configuration.

8. The one or more media of claim 1, further storing operations which, when executed by one or more processors, cause:
based at least on a third user-defined test configuration, executing a third test execution plan comprising:
generating a third test container comprising a third instance of a second container image that encapsulates a second test environment different from the first test environment;
generating a third test support container configured to perform a second test support operation;
wherein the third test container and the third test support container are reproducible software modules that may be executed on the one or more container platforms;
executing the third test container and the third test support container on a third container platform to perform a third test in the second test environment according to the third user-defined test configuration.

9. The one or more media of claim 8, wherein the third test support container is different from any test support container specified in the first user-defined test configuration and the second user-defined test configuration.

10. The one or more media of claim 1, wherein the first test support container is further configured to retrieve the input data from a storage location designated in the first user-defined test configuration.

11. The one or more media of claim 1, wherein the first test support container is further configured to transmit the output data to a storage location designated in the first user-defined test configuration.

12. The one or more media of claim 1, wherein the first test support operation comprises generating one or more metrics associated with the first test.

13. The one or more media of claim 1, wherein the first test support operation comprises storing log data generated by the first test.

14. The one or more media of claim 1, further storing instructions which, when executed by one or more processors, cause:
determining that the first test container is a perpetual container;
reusing the first test container for the second test after completion of the first test.

15. The one or more media of claim 14, further storing instructions which, when executed by one or more processors, cause:
restoring the first test container to a clean state after the first test and before the second test.

16. The one or more media of claim 1, further storing instructions which, when executed by one or more processors, cause:
determining that the first test container is a single-use container;
destroying the first test container after completion of the first test.

17. The one or more media of claim 1, wherein the first test support container is specified in the first user-defined test configuration.

18. The one or more media of claim 1:
wherein executing the first test execution plan is orchestrated by a particular test orchestration agent of a plurality of test orchestration agents, the one or more media further storing instructions which, when executed by one or more processors, cause:
receiving a request to perform the first test;
storing the request in a test request queue;
selecting the particular test orchestration agent based at least on a load balancing policy associated with the plurality of test orchestration agents;
dispatching the request to the particular test orchestration agent;
generating, by the particular test orchestration agent, the first test execution plan based at least on the first user-defined test configuration,
wherein the plurality of test orchestration agents are distributed across a plurality of hardware systems and the load balancing policy is based at least on availability of one or more system resources in the plurality of hardware systems,
wherein availability of the one or more system resources comprises central processing unit (CPU) usage and free memory size;
the one or more media further storing operations which, when executed by one or more processors, cause:
based at least on a third user-defined test configuration, executing a third test execution plan comprising:
generating a third test container comprising a third instance of a second container image that encapsulates a second test environment different from the first test environment;
generating a third test support container configured to perform a second test support operation;
wherein the third test container and the third test support container are reproducible software modules that may be executed on the one or more container platforms;

executing the third test container and the third test support container on a third container platform to perform a third test in the second test environment according to the third user-defined test configuration,
   wherein the third test support container is different from any test support container specified in the first user-defined test configuration and the second user-defined test configuration;
wherein the first test support container is further configured to retrieve the input data from a storage location designated in the first user-defined test configuration;
wherein the first test support container is further configured to transmit the output data to a storage location designated in the first user-defined test configuration;
wherein the first test support operation comprises one or more of generating one or more metrics associated with the second test or storing log data generated by the second test;
the one or more media further storing instructions which, when executed by one or more processors, cause:
   determining that the first test container is a perpetual container;
   restoring the first test container to a clean state after the first test and before the second test;
   reusing the first test container for the second test after completion of the first test;
wherein the first test support container is specified in the first user-defined test configuration.

19. A system comprising:
at least one device including a hardware processor;
the system being configured to perform operations comprising:
executing a plurality of test execution plans using: instances of a same first container image that encapsulates a first test environment; and instances of at least two different test support container images that are specified by different user-defined test configurations and each configured to perform, respectively, one or more test support operations, wherein executing the plurality of test execution plans comprises:
(a) based at least on a first user-defined test configuration, executing a first test execution plan comprising:
   generating a first test container comprising a first instance of the first container image that encapsulates the first test environment;
   generating a first test support container configured to supply input data to the first instance of the first container image and obtain output data from the first instance of the first container image during a first test;
   wherein the first test container and the first test support container are encapsulated reproducible software modules that may be executed on one or more container platforms;
   executing the first test container and the first test support container on a first container platform to perform the first test in the first test environment according to the first user-defined test configuration;
(b) based at least on a second user-defined test configuration, executing a second test execution plan comprising:
   generating a second test container comprising a second instance of the first container image that encapsulates the first test environment;
   generating a second test support container that is specified in the second user-defined test configuration and configured to perform at least a first test support operation, wherein the second test support container is different from any test support container specified in the first user-defined test configuration;
   wherein the second test container and the second test support container are reproducible software modules that may be executed on the one or more container platforms;
   executing the second test container and the second test support container on a second container platform to perform a second test in the first test environment according to the second user-defined test configuration.

20. A method comprising:
executing a plurality of test execution plans using: instances of a same first container image that encapsulates a first test environment; and instances of at least two different test support container images that are specified by different user-defined test configurations and each configured to perform, respectively, one or more test support operations, wherein executing the plurality of test execution plans comprises:
(a) based at least on a first user-defined test configuration, executing a first test execution plan comprising:
   generating a first test container comprising a first instance of the first container image that encapsulates the first test environment;
   generating a first test support container configured to supply input data to the first instance of the first container image and obtain output data from the first instance of the first container image during a first test;
   wherein the first test container and the first test support container are encapsulated reproducible software modules that may be executed on one or more container platforms;
   executing the first test container and the first test support container on a first container platform to perform the first test in the first test environment according to the first user-defined test configuration;
(b) based at least on a second user-defined test configuration, executing a second test execution plan comprising:
   generating a second test container comprising a second instance of the first container image that encapsulates the first test environment;
   generating a second test support container that is specified in the second user-defined test configuration and configured to perform at least a first test support operation,
   wherein the second test support container is different from any test support container specified in the first user-defined test configuration;
   wherein the second test container and the second test support container are reproducible software modules that may be executed on the one or more container platforms;
   executing the second test container and the second test support container on a second container platform to perform a second test in the first test environment according to the second user-defined test configuration,
wherein the method is performed by at least one device comprising a hardware processor.

* * * * *

UNITED STATES PATENT AND TRADEMARK OFFICE
CERTIFICATE OF CORRECTION

| | |
|---|---|
| PATENT NO. | : 11,307,967 B2 |
| APPLICATION NO. | : 16/361510 |
| DATED | : April 19, 2022 |
| INVENTOR(S) | : Zhang et al. |

It is certified that error appears in the above-identified patent and that said Letters Patent is hereby corrected as shown below:

In the Specification

In Column 7, Line 40, delete "thereof" and insert -- thereof. --, therefor.

Signed and Sealed this
Sixteenth Day of August, 2022

Katherine Kelly Vidal
*Director of the United States Patent and Trademark Office*